United States Patent
Hartog et al.

(10) Patent No.: US 9,299,121 B2
(45) Date of Patent: Mar. 29, 2016

(54) PREEMPTIVE CONTEXT SWITCHING

(75) Inventors: Robert Scott Hartog, Windemere, FL (US); Ralph Clay Taylor, Deland, FL (US); Michael Mantor, Orlando, FL (US); Kevin McGrath, Los Gatos, CA (US); Sebastien Nussbaum, Lexington, MA (US); Nuwan Jayasena, Sunnyvale, CA (US); Rex McCrary, Oviedo, FL (US); Mark Leather, Los Gatos, CA (US); Philip J. Rogers, Pepperell, MA (US); Thomas R. Woller, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 368 days.

(21) Appl. No.: 13/289,714

(22) Filed: Nov. 4, 2011

(65) Prior Publication Data
US 2012/0194524 A1  Aug. 2, 2012

Related U.S. Application Data

(60) Provisional application No. 61/423,498, filed on Dec. 15, 2010.

(51) Int. Cl.
| | | |
|---|---|---|
| G06F 15/16 | (2006.01) | |
| G06F 15/00 | (2006.01) | |
| G06T 1/00 | (2006.01) | |
| G06T 1/20 | (2006.01) | |
| G06F 9/48 | (2006.01) | |

(52) U.S. Cl.
CPC .............. *G06T 1/20* (2013.01); *G06F 9/4812* (2013.01); *G06F 9/4881* (2013.01)

(58) Field of Classification Search
USPC .......... 345/501–503, 522; 718/100–103, 107, 718/108
See application file for complete search history.

(56) References Cited

U.S. PATENT DOCUMENTS

| | | | |
|---|---|---|---|
| 7,623,134 B1* | 11/2009 | Danilak | 345/568 |
| 2007/0136730 A1* | 6/2007 | Wilt et al. | 718/102 |
| 2009/0160867 A1* | 6/2009 | Grossman | 345/522 |
| 2010/0026682 A1* | 2/2010 | Plowman et al. | 345/419 |

* cited by examiner

*Primary Examiner* — Jacinta M Crawford
(74) *Attorney, Agent, or Firm* — Volpe and Koenig, P.C.

(57) ABSTRACT

Methods, systems, and computer readable media embodiments are disclosed for preemptive context-switching of processes running on a accelerated processing device. Embodiments include, detecting by an accelerated processing device a memory exception, and preempting a process from running on the accelerated processing device based upon the detected exception.

22 Claims, 6 Drawing Sheets

PREEMPTIVE CONTEXT SWITCHING

CROSS REFERENCE TO RELATED APPLICATIONS

This application claims the benefit of U.S. provisional application No. 61/423,498, filed on Dec. 15, 2010, which is hereby incorporated by reference in its entirety.

BACKGROUND

1. Field of the Invention

The present invention is generally directed to computing systems. More particularly, the present invention is directed to context-switching of processes executed within a computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, since processes cannot be efficiently identified and/or preempted, a rogue process can occupy the GPU for arbitrary amounts of time. The occupying of the GPU by rogue processes for arbitrary amounts of time can prevent the effective utilization of the available system capacity, and can prevent or significantly reduce the processing progress of the system. In other cases, the ability to context switch off the hardware is severely constrained—occurring at very coarse granularity and only at a very limited set of points in a program's execution.

SUMMARY OF EMBODIMENTS

Therefore, what is needed is a method and system for efficiently preempting one or more processes from a GPU and context switching one or more other processes onto the GPU.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

An embodiment of the present invention provides for APD-initiated preemptive context-switching of processes running on an APD.

Another embodiment includes detecting a memory exception by an APD, and preempting a process from running on the APD based upon the detected exception.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

Figure 1A:
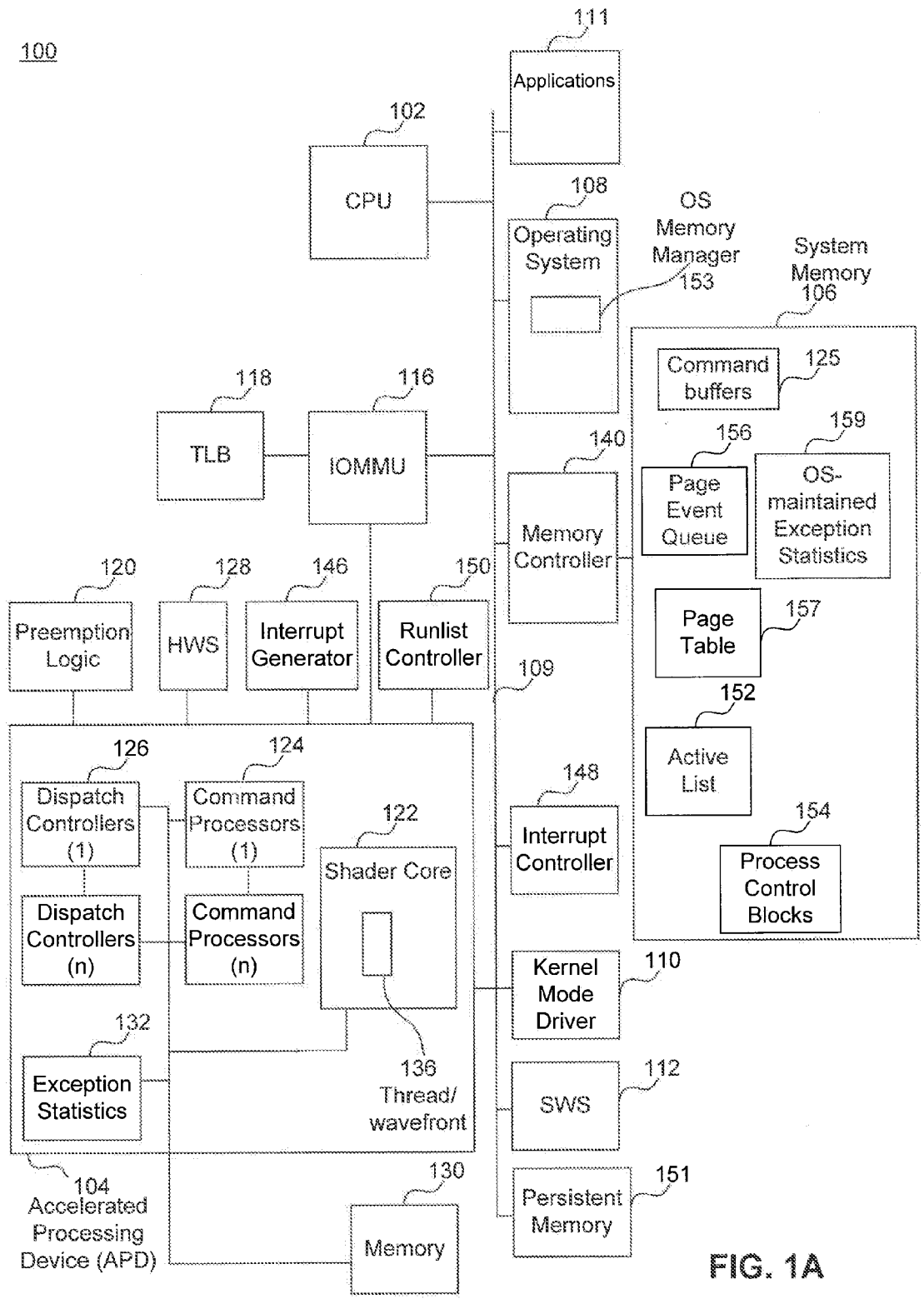
FIG. 1A is an illustrative block diagram of a processing system, in accordance with embodiments of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally and/or structurally similar elements. The drawing in which an element first appears is indicated by the leftmost digit(s) in the corresponding reference number.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system (OS) 108, and a communication infrastructure 109. The OS 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Microsoft Windows® platforms, can run in kernel-mode (Ring 0) or in user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the OS 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes instructions and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such as a dispatch processor, command processor, or network controller. On the other hand, instructions can be considered as, for example, a single operation of a processor within a computer architecture. In one example, when using two sets of ISAs, some instructions are used to execute x86 programs and some instructions are used to execute kernels on APD compute unit.

In an illustrative embodiment, CPU 102 transmits selected commands and/or other instructions to APD 104. These selected instructions can include graphics instructions and other commands amenable to parallel execution. These selected instructions, that can also include compute processing instructions, can be executed substantially independently from CPU 102.

APD 104 can include its own compute units (not shown), such as, but not limited to, one or more single instruction multiple data (SIMD) processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued instruction.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by an instruction. A work-item can be executed by one or more processing elements as part of a work-group executing on a compute unit.

A work-item is distinguished from other executions within the collection by its global ID and local ID. In one example, a subset of work-items in a workgroup that execute simultaneously together on a single SIMD engine can be referred to as a wavefront 136. The width of a wavefront is a characteristic of the hardware of the compute unit (e.g., SIMD processing engine). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves instructions to be executed from command buffers 125 in memory 106 and coordinates the execution of those instructions on APD 104.

In one example, CPU 102 inputs instructions based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a instruction executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing instructions from the corresponding command buffer 125. In some instances, CP 124 can generate one or more instructions to be executed within APD 104, which correspond with instructions received from CPU 102. In one embodiment, CP 124, together with other components, implements a prioritizing and scheduling of instructions on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the OS 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/to a final state. An initial state is a starting point for a machine to process an input data set according to a programming in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, OS functions, processing logic instructions, and system software can reside in memory 106. Control logic instructions fundamental to OS 108 will generally reside in memory 106 during execution. Other software instructions, including, for example, kernel mode driver 110 and software scheduler 112 can also reside in memory 106 during execution of system 100.

In this example, memory 106 includes command buffers 125 that are used by CPU 102 to send instructions to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context can include a set of devices, the memory accessible to those devices, the corresponding memory properties and one or more command-queues used to schedule execution of a kernel(s) or operations on memory objects. On the other hand, process can be considered the execution of a program for an application that runs on a computer. The OS can create data records and virtual memory address spaces for the program to execute. The memory and current state of the execution of the program can be called a process. The OS may schedule tasks for the process to operate on the memory from an initial to final state.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, OS 108 includes functionality to manage the hardware components of system 100 and to provide common services. In various embodiments, OS 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, OS 108 invokes an appropriate interrupt handling routine. For example, upon detecting a page fault interrupt, OS 108 may invoke an interrupt handler to initiate loading of the relevant page into memory 106 and to update corresponding page tables.

OS 108 may also include functionality to protect system 100 by ensuring that access to hardware components is mediated through OS managed kernel functionality. In effect, OS 108 ensures that applications, such as applications 111, run on CPU 102 in user space. OS 108 also ensures that applications 111 invoke kernel functionality provided by the OS to access hardware and/or input/output functionality.

According to an embodiment of the present invention, the operating system includes an OS memory manager 153. OS memory manager 153 can include functionality to manage memory objects such as, but not limited to, page tables 157 and page event queues 156. Page tables 157 can be tables that indicate the location of pages currently loaded in memory 106. Page event queue 156 can be a queue in which page related events, such as page fault events, are enqueued by other devices, such as IOMMU 116, in order to communicate page related information to the OS. Exception statistics may be maintained in by a module 159. One or more registers 132 in the APD may be used to maintain exception statistics.

By way of example, applications 111 include various programs or instructions to perform user computations that are also executed on CPU 102. The unification concepts can allow CPU 102 can seamlessly send selected instructions for processing on the APD 104.

In one example, KMD 110 implements an application program interface (API) through which CPU 102, or applications executing on CPU 102 or other logic, can invoke APD 104 functionality. For example, KMD 110 can enqueue instructions from CPU 102 to command buffers 125 from which APD 104 will subsequently retrieve the instructions. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing instructions.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, OS, and system software can include commands and/or other instructions specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
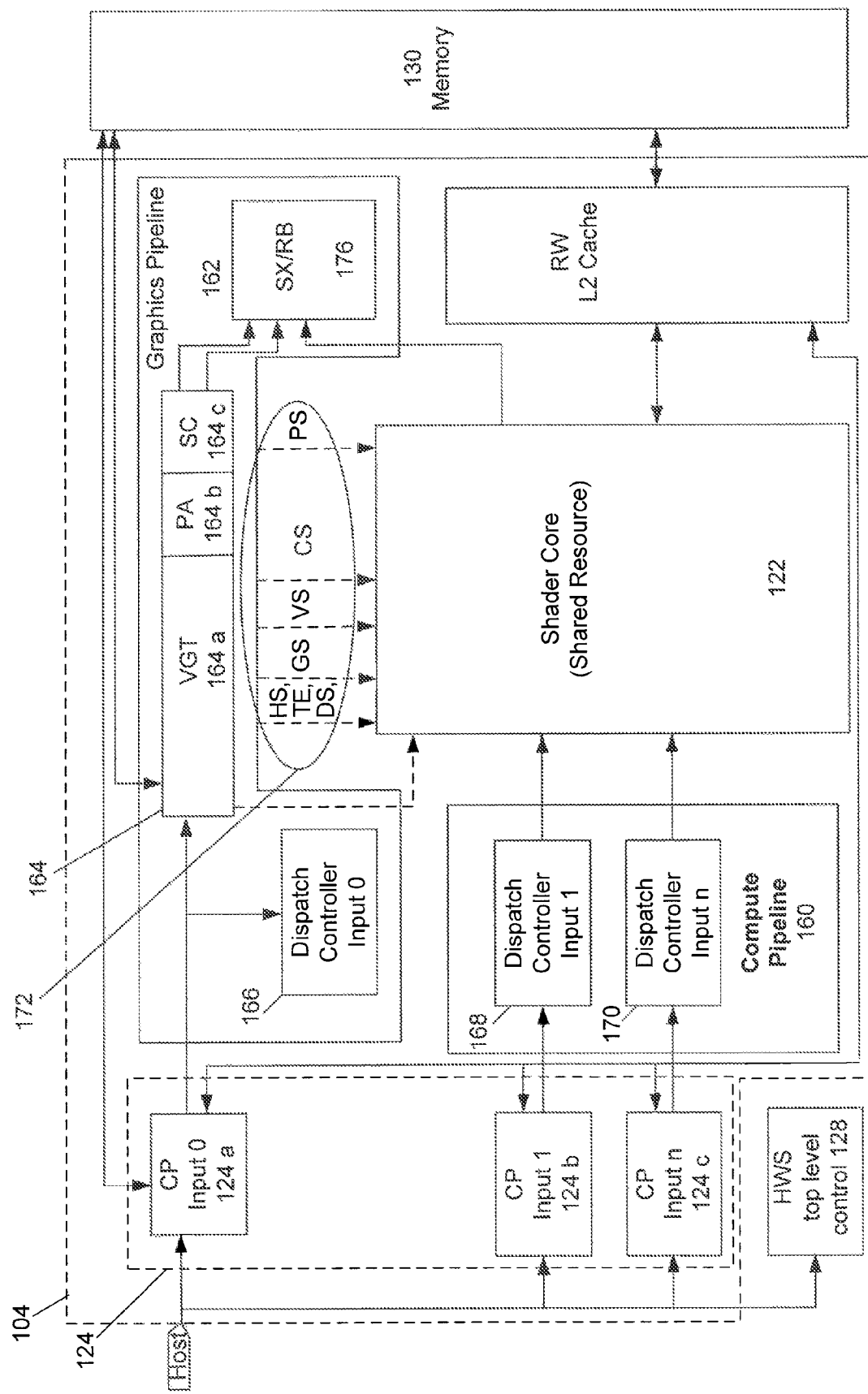
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124*a*, 124*b*, and 124*c*. CP 124 can be configured to process the command lists that are provided as inputs from command buffers 125, shown in FIG. 1A. In the exemplary operation of FIG. 1B, CP input 0 (124*a*) is responsible for driving instructions into a graphics pipeline 162. CP inputs 1 and 2 (124*b* and 124*c*) forward instructions to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164*a*, a primitive assembler (PA) 164*b*, a scan converter (SC) 164*c*, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124*a*. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124*b* and 124*c*.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data.

Figure 2:
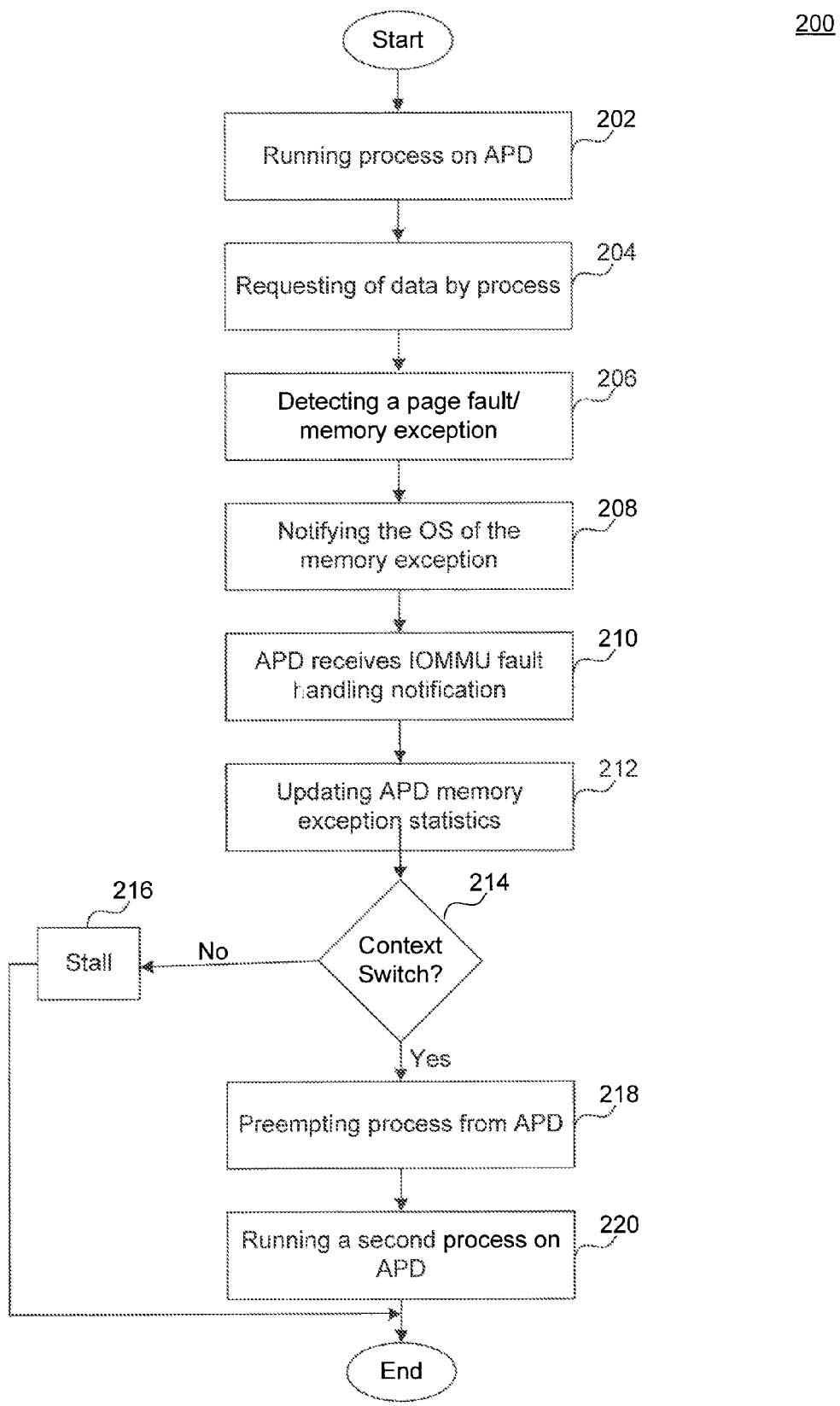
FIG. 2 is a flowchart illustrating a method for APD context switching, according to an embodiment of the present invention.

FIG. 2 illustrates a flowchart of a method 200 for APD context switching, according to an embodiment of the present invention. For example, method 200 may run on system 100 shown in FIGS. 1A and 1B. With method 200, an APD can detect a memory exception, e.g., a page fault, and is able to initiate and implement a context switch of processes initiated. The method 200 may not occur in the order shown, or require all of the steps.

In step 202, the APD runs a first process. Running of a process can include the command processor of the APD selecting the process from a run list of processes and running the process on the appropriate processing pipeline. Graphics processing utilizes the graphics pipeline of the APD, and the compute pipeline utilizes the compute pipeline. Both types of processes can utilize a shader core of the APD for processing, e.g., as discussed above.

In step 204, the first process running on the APD requests data. According to an embodiment, the request from the first process running on the APD is intercepted by, or directed to, a memory management unit. The memory management unit can be an IOMMU communicatively coupled to the APD, e.g., as discussed above with regards to system 100. The IOMMU may be incorporated in the APD, may be incorporated in another memory management unit, such as a memory controller, or may be implemented separately. The IOMMU can include the functionality to translate between the virtual memory address space as seen by the APD and the system memory physical address space.

In step 206, the IOMMU receives the request for data from the APD and attempts to perform the translation of the requested data from the APD's virtual address space to the physical address space. The IOMMU then attempts to retrieve the data from memory based upon the determined physical address of the data. According to an embodiment, the IOMMU attempts to retrieve the requested data from system memory, such as system memory 106.

By way of example, if the requested data is not in system memory, a memory exception or page fault is triggered. According to an embodiment, the page fault can be triggered by the IOMMU or other hardware or software component associated with the IOMMU access to memory. A page fault, as used herein, indicates that a requested memory object, such as a page of in-memory data, does not exist in physical memory that is accessible to the requesting entity.

A page fault can be triggered, for example, if an entry corresponding to the virtual address is not present in the page table. A page fault can also be triggered for other reasons, such as when a page table entry for the requested virtual address exists but the corresponding page is not accessible to the requesting process. For example, a page may not be accessible to the requesting process due to synchronization or mapping issues between the page table accessible to the IOMMU and system memory, due to memory protection errors such as when the requesting device or process is not permitted to access the area of memory in which the requested address is present, and the like.

According to an embodiment, upon receiving from the APD a request for data, the IOMMU accesses a TLB with the request for data. The TLB can be implemented in the IOMMU, the APD, or separately. The TLB is a cache, typically implemented in a CAM, which performs translation between the system memory physical address space and a virtual address space in a more efficient manner than by using page table lookup. According to an embodiment, a lookup is performed in the TLB using a virtual address as seen by the process executing on the APD. If the TLB currently has an entry corresponding to that virtual address, then the corresponding physical memory address is returned to the IOMMU. The IOMMU can then attempt to retrieve the corresponding page from the memory.

If the TLB presently does not have an entry corresponding to the virtual address, then a TLB miss occurs. Upon a TLB miss, the IOMMU may lookup the requested virtual address in the page table. The process of the IOMMU looking up the page table for a virtual address is sometimes referred to as a page table walk. The page table walk, in general, is more time consuming than looking up that address using a TLB.

In step 208, the OS is notified of the page fault. According to an embodiment, the OS is notified by an interrupt generated by the IOMMU. The IOMMU may generate the interrupt upon detecting that the requested virtual address does not exist in the TLB and in the page table accessible to the IOMMU. According to another embodiment, the interrupt can be generated by the IOMMU upon receiving a signal from the APD requesting the generation of the interrupt.

In step 210, the IOMMU notifies the APD that the OS was notified of the page fault. According to various embodiments, IOMMU can generate the notification to the APD immediately upon generating an interrupt to the OS indicating the page fault, after confirmation by the OS that it has initiated recovery for the page faulted data, or at anytime in between.

In step 212, one or more statistics related to memory-exceptions, such as page faults, caused by memory accesses by processes running on the APD are updated. The memory-exception statistics can be maintained by, and/or be accessible to the APD. Exemplary memory-exception related statistics can include list of outstanding page faults, number of TLB misses, number of page faults, TLB miss and page fault statistics for selected processes, and page fault recovery times (e.g., time between page fault and the corresponding page being made available in memory). The statistics can, for example, be maintained in one or more registers 132 accessible to the APD.

In step 214, the APD determines if there should be a context switch or a stall in response to the detected page fault. In the embodiment, the CP, upon receiving the notification from the IOMMU that the OS was notified of the page fault, can invoke logic to determine if, based on the detected page fault, a context switch or stall should be implemented in the APD. The APD functionality that determines if a context switch should be attempted when a page fault is detected can be implemented as a preemption and context switch logic.

In embodiments of the present invention, the decision to context switch or stall is based upon a metric that may be heuristically determined based upon information available to the APD regarding page faults and/or other exceptions. The APD may or may not have access to page fault statistics maintained by the OS.

Figure 5:
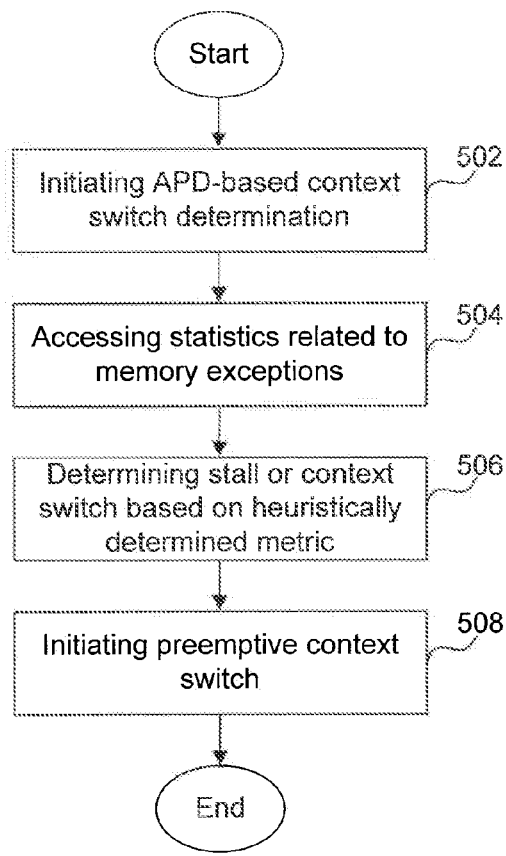
FIG. 5 is a flowchart illustrating a method for determining if the APD should be context switched, according to an embodiment of the present invention.

In another embodiment, the APD determines to initiate a context switch based upon one or more statistics maintained by the APD. For example, the APD may determine that, based on statistics available to it, a process currently running on the APD has caused more page faults than a predetermined threshold, and therefore a context switch is warranted. A discussion below, in relation to FIG. 5, provides more detail regarding whether to context switch or stall based upon heuristically determined metrics and page fault statistics accessible to the APD.

If, in step 214, it is determined that no context switch is required then a stall is performed at step 216. In step 216 the APD may not take any further action regarding the currently running process for at least the expiration of a predetermined time interval or being triggered to take such action.

In one example, the APD can reconsider the context switch decision 214 at the expiration of the predetermined time interval, or upon the receipt of a message from the IOMMU asserting that the pending page fault has been resolved. The pending page fault may be resolved during a stall, for example, when the OS loads or reloads the corresponding page into system memory and notifies the IOMMU that the page is now available. In this example, the APD, for a predetermined time interval, can continue to poll the IOMMU for the resolution of the page fault. In another embodiment, the IOMMU can itself notify the APD when the page fault has been resolved by the OS.

If, in step 214, it is determined that a context switch is to be initiated, then in step 218, the APD initiates the preemption of the current process from the APD.

In step 220, the APD can initiate the running of a second process in the APD. The initiation of the preemption of an APD process and the initiation of the context switch can be performed by, for example, the APD, or more specifically, the preemption and context switch logic, HWS and/or by the KMD and SWS when triggered by the APD. FIG. 5 provides more detail regarding APD-initiated preemption of APD processes and context switching.

Figure 3:
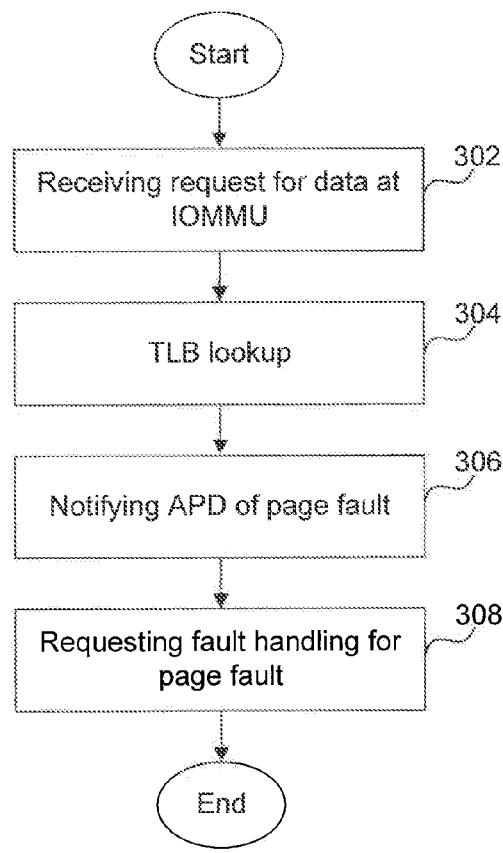
FIG. 3 is a flowchart illustrating a method for detecting a page fault/memory exception, according to an embodiment of the present invention.

FIG. 3 is a flowchart illustrating an exemplary method 206 for detection of a memory exception or page fault, according to an embodiment of the present invention. For example, method 206 may run on system 100 in FIGS. 1A and 1B. According to an embodiment, steps 302-308 may be used in performing the functionality of step 206 discussed above. The method 206 may not occur in the order shown, or require all of the steps.

In step 302, the IOMMU receives a request for data from the APD. The request can include the virtual address of a single data element or a block of data.

In step 304, the IOMMU initiates a TLB lookup for the requested data. The TLB lookup can be performed using the virtual address provided by the APD, or a virtual address derived based upon the received virtual address. For example, the IOMMU can derive an address of a block of data based upon the address provided by the APD.

The TLB lookup, if successful, results in the TLB returning the physical address corresponding to the virtual address on which the lookup was based.

If the TLB lookup is not successful (i.e., TLB miss), an indication of the miss is returned to the IOMMU and/or APD. Accordingly, the IOMMU and/or APD, upon receiving the TLB miss indication, can choose to initiate a retry sequence of performing the TLB lookup. For example, the retry sequence may involve continually retrying the TLB lookup at predetermined intervals.

In step 306, if a TLB miss resulted in step 304, the APD is notified of a page fault. In one example, the IOMMU receives the TLM miss indication and initiates the page table walk to locate the address in the page tables. In another embodiment, the APD is notified of the miss, for example, by the IOMMU which initially receives the TLB request miss notification, or by receiving the miss notification directly in the APD from the TLB. The APD may then request the IOMMU to translate the address and/or retrieve the data corresponding to the requested address using the page tables. In the example, the APD can transmit an address translation service (ATS) Request to the IOMMU to initiate the page walk for the requested virtual address.

If an entry corresponding to the virtual address is located in the page table, then the corresponding request for the data can be sent to memory to retrieve data as appropriate. If no entry corresponding to the requested virtual address is located in the page table, then the IOMMU signals a page fault to the APD. According to an embodiment, the APD is notified of the page fault using an ATS response.

In step 308, the APD requests fault handling for the page fault from the OS. According to an embodiment, the APD makes the request through the IOMMU. The fault handling request to the OS can be generated by an interrupt and/or message that the APD exchanges with the IOMMU.

Figure 4:
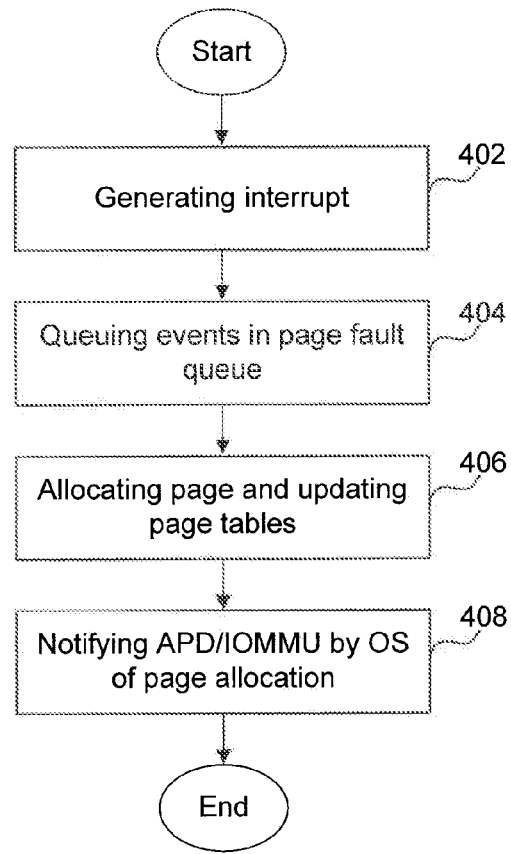
FIG. 4 is a flowchart illustrating a method for the APD to notify the operating system of a page fault, according to an embodiment of the present invention.

FIG. 4 illustrates a flowchart of an exemplary method 208 for notifying the OS about a page fault, according to an embodiment of the present invention. For example, method 208 may ran on system 100 in FIGS. 1A and 1B. In the embodiment of FIG. 4, steps 402-08 can be performed in order to implement at least some of the functionality of step 208 described above. The method 208 may or may not occur in the order shown, an may or may not require all of the steps.

In step 402, an interrupt, e.g., corresponding to page faults, is generated. According to an embodiment, the interrupt is generated by the IOMMU on behalf of the APD. According to another embodiment, the APD can directly cause the generation of the interrupt without going through the IOMMU.

In step 404, a page fault event is enqueued in a page fault event queue in system memory. The enqueued page fault event can include information necessary for the OS to service the page fault and to maintain statistics about page faults. The page fault event includes the type of page fault, the time the page fault is generated, virtual address upon which the page fault was generated, the process requesting the virtual address upon which the page fault was generated, and the identity of the device causing the page fault.

In step 406, the OS allocates the page that caused the page fault. The OS becomes aware of the page fault, for example, by being notified by an interrupt service routine that traps the interrupt generated by the IOMMU and/or APD in step 402. Upon receiving the interrupt, the OS can retrieve the corresponding page fault event from a page fault event buffer. The page fault event provides the OS with detailed information regarding the page fault. If the page fault is due to a page not being in memory, the OS attempts to load the page into memory and update the page tables correspondingly. If the page fault is due to the page tables not being correctly updated with information regarding pages already in memory, the OS updates the corresponding entry in the page table.

In step 408, the OS notifies the IOMMU and/or APD that the page was loaded. According to an embodiment, this notification is delivered using an interrupt which is trapped by the IOMMU. The OS may, according to embodiments, issue this notification upon the initiating or upon the completing of the loading of the corresponding page and/or updating of the corresponding page tables.

FIG. 5 is a flowchart illustrating a method 214, according to an embodiment of the present invention. For example, method 214 includes steps 502-508 for determining if an APD should be context switched, according to an embodiment of the present invention. Steps 502-508 can be performed, for example, in implementing step 210 described above on, for example, system 100 shown in FIGS. 1A and 1B.

Step 502 initiates the APD-based context switching determination, e.g., in response to the detected page fault. For example, step 502 can be performed upon the APD receiving notification from the IOMMU that a page fault has occurred or upon the APD receiving notification from the IOMMU that the OS has been notified regarding the page fault.

In the example shown in FIG. 1A, the APD-based context switching determination can be performed by one or more of preemption and context switch logic 120, HWS 128, KMD 110, or SWS 112. A hardware-based logic such as HWS 128 or preemption and context switch logic 120 can be initiated to perform steps 504-506. For example, hardware-based schedulers such as 120 or 128 can make a context switch determination using a heuristic criteria based on APD maintained statistics, and context-switch a process that is already in the hardware-maintained ran list 150.

In another embodiment, the APD can cause KMD 110 and SWS 112 to make the determination to context-switch based upon the APD-maintained statistics. Software-based KMD 110 and/or SWS 112 can, for example, have access to additional statistics and also scheduling information, such as the processes in the active list.

In step 504, the APD, or more particularly one of preemption and context switch logic 120, HWS 128, KMD 110, SWS 112 (see FIG. 1A), accesses information regarding the page fault and other page fault statistics that are accessible to the APD. For example, as described above, some predetermined statistics can be stored and maintained in registers accessible to the APD. Exemplary memory-exception related statistics can include list of outstanding page faults, number of TLB misses, number of page faults, TLB miss and page fault statistics for selected processes, and page fault recovery times (e.g., time between page fault and the corresponding page being made available in memory) and/or the like.

In step 506, based upon heuristic criteria and page fault statistics maintained by the APD, a determination is made to either initiate a preemptive context switch or to allow the current process in the APD to stall. For example, the APD might determine, based on statistics available to it, that a process currently running on the APD has caused more page faults than a predetermined threshold, and therefore a context switch is warranted.

A heuristic determination, for example, can be based on the oldest outstanding page fault or memory access, such as to initiate a context switch of the oldest outstanding page fault or memory access is older than a predetermined threshold interval. A heuristic determination could also be based on the priority of the processes in the run list. That is, if one or more processes in the run list have a priority higher than a threshold, then a determination to context switch the current process may be made at a lower threshold of page fault occurrences than if the run list had only lower priority processes.

The heuristic determination to context switch can also be used to (i) remove a running process that is causing a relatively high number of page faults and/or (ii) provide selected processes (e.g., based upon a priority) the ability to make progress in processing without being excessively delayed by page faults due to other processes, etc.

If the APD has access to OS maintained page fault statistics, such as statistics 159, then the heuristic determination can consider such statistics in place of, or in combination with, statistics maintained by the APD.

In step 508, the context switch is initiated by the APD. According to an embodiment, SWS 112 and/or KMD 110 of FIG. 1A can trigger the sending of instructions to preempt the current process and context switch to a second process. The SWS can be implemented as either a part of the KMD for the APD or as a separate module that communicates with the APD through the KMD.

In another embodiment, the preemption of the current process and context switching of the APD to a new process can be performed by the APD 104, the HWS 128 or preemption and context switch logic 120 without invoking software functionality of KMD 110 or SWS 112 (see FIG. 1A). For example, preemption and context switch logic 120 can determine a context switch is required and can cause the CP 124 to preempt the currently running process. HWS 128 can, with CP 124, then context switch another process from RLC 150 to run on the APD 104.

According to an embodiment, upon being signaled or upon determining to initiate a context switch on the APD, the SWS performs the scheduling of processes to run on the APD. The SWS can maintain a list of processes from which the processes to be run on the APD are selected. The list of runnable processes can be maintained as a single or multi-level list. The list of runnable processes is maintained as a two-level list. At the higher level, the SWS enqueues the runnable processes to an active-list, such as active list, maintained in system memory. The active-list includes an entry for each process that the SWS has scheduled to be run on the APD. Each entry in the active-list can include, or can point to, information regarding the process that may be needed for the execution of the process on the APD.

For example, each entry in the active-list can point to a corresponding entry in the list of process control blocks in system memory. The process control blocks can include information regarding, for example, process state, program counter, and the like. The SWS can select some processes from the active-list and enqueue them in a second level list of runnable processes referred to herein as the run list.

According to an embodiment, the run list may include a plurality of processes selected to be run on the APD by the SWS. The run list can be implemented in the hardware or firmware, and can be managed by the APD or an associated HWS. Whereas the SWS selects the processes to be input to the run list, the HWS can select the process to be run on the APD from those included in the run list. The selection of the next process to be run on the APD can be based upon a round-robin or other selection discipline.

Upon initiating a context switch on the APD, the SWS first signals the APD to preempt the current process, which caused the page fault. According to an embodiment, the SWS first signals the APD to stop executing the current process. The SWS next signals the APD to remove the current process from the run list, and to save the context of the current process to system memory. The SWS may also provide an address in system memory to which the context of the current process is to be saved.

Stopping the current process from executing on the shader core, removing it from the run list, and saving its context completes the preemption of the current process from executing on APD. The SWS instructions directing the preemption are received and acted upon by the CP to preempt the current process from executing on the shader processor.

Having preempted the current process from executing on the APD, the SWS selects a second process to run on the APD. According to an embodiment, the SWS selects the second process from the active-list or as a new process to be added to the list of runnable processes. If the second process already has stored context, for example, from a previous execution, then the SWS signals the APD to restore the context for the second process. The SWS can then signal the APD to add the second process to the run list managed by the HWS. When the HWS selects the second process to run from the run list, the CP will dispatch the second process and restore any context necessary for the execution of the second process on the APD.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   detecting by an accelerated processing device a memory exception which is in response to a request for data;
   accessing a statistic associated with memory exceptions which occur in response to requests for data;
   comparing the statistic with a threshold;
   determining whether a process should be context switched based upon the comparison;
      on a condition that it is determined that the process should be context switched, preempting the process from running on the accelerated processing device and context switching the process; and
      on a condition that it is determined that the process should not be context switched, stalling the process.

2. The method of claim 1, wherein the preempting of the process comprises preempting of the process from running on an accelerated processor portion of the accelerated processing device.

3. The method of claim 1, further comprising:
   requesting, by an input output memory management unit coupled to the accelerated processing device, data from the memory;
   determining, by the accelerated processing device, whether the data is absent from an accessible area of the memory;

receiving, at the accelerated processing device, notification of the absence; and
generating an interrupt associated with the absence.

4. The method of claim 3, further comprising:
queuing an event indicating the exception in the memory, wherein the queued event is accessible by an operating system (OS).

5. The method of claim 4, further comprising:
requesting, by the accelerated processing device, fault handling associated with the exception from the input output memory management device.

6. The method of claim 5, further comprising: receiving a signal indicating a status regarding the queued event from the OS.

7. The method of claim 3, wherein the determining whether the data is absent comprises:
signaling to a driver associated with the accelerated processing device regarding the absence; and
determining by the kernel mode driver whether to preempt or stall the process.

8. The method of claim 1, further comprising:
determining a type of the exception;
wherein determining whether the process should be context switched is based upon the determined type.

9. The method of claim 1,
wherein the memory exception is caused by a process;
wherein the statistic comprises a number of memory exceptions caused by the process; and
wherein determining whether the process should be context switched is based upon whether the number of memory exceptions caused by the process exceeds the threshold.

10. The method of claim 1, further comprising:
accessing statistics associated with exceptions;
determining a metric related to a type of the exception based upon the accessed statistics; and
wherein determining whether the process should be context switched is based on the determined metric.

11. The method of claim 10, wherein the statistics include a performance statistic of a translation look-ahead buffer.

12. A system comprising:
at least one accelerated processing device comprising
circuitry configured to detect a memory exception which is in response to a request for data;
circuitry configured to access a statistic associated with memory exceptions in response to requests for data;
circuitry configured to compare the statistic with a threshold;
circuitry configured to determine whether a process should be context switched based upon the comparison;
context switching circuitry configured to, on a condition that it is determined that the process should be context switched, preempt the process from running on the at least one accelerated processing device and context switch the process; and
the context switching circuitry further configured to, on a condition that it is determined that the process should not be context switched, stall the process.

13. The system of claim 12, wherein the preempting of the process comprises preempting of the process from running on an accelerated processor portion of the at least one accelerated processing device.

14. The system of claim 12,
wherein the memory exception is caused by a process;
wherein the statistic comprises a number of memory exceptions caused by the process; and
wherein determining whether to context switch the process is based upon whether the number of memory exceptions caused by the process exceeds the threshold.

15. The system of claim 12, further comprising:
an input output memory management device comprising:
circuitry configured to receive a request for data from the memory;
circuitry configured to determine that the data is absent from an accessible area of the memory; and
circuitry configured to generate an interrupt associated with the absence.

16. The system of claim 15, further comprising:
a translation lookahead buffer coupled to the input output memory management device and configured to determine if the requested data is present in the memory.

17. The system of claim 16, further comprising:
at least one central processing device configured to run one or more processes to initiate the process in the at least one accelerated processing device.

18. The system of claim 17, further comprising:
a kernel mode driver executing on the central processing device and configured to receive notification from the at least one accelerated processing device regarding the absence, and to determine whether to preempt or stall the process.

19. A non-transitory computer readable medium storing instructions, wherein the instructions, if executed by a processing device, cause the processing device to:
detect a memory exception which is in response to a request for data;
access a statistic associated with memory exceptions which occur in response to requests for data;
compare the statistic with a threshold;
determine whether the process should be context switched based upon the comparison;
on a condition that it is determined that the process should be context switched, preempt the process from running on the processing device and context switch the process; and
on a condition that it is determined that the process should not be context switched, stall the process.

20. The non-transitory computer readable medium of claim 19, wherein the instructions, if executed by the processing device, further cause the processing device to:
request, by an input output memory management device, data from the memory;
determine, whether the data is absent from an accessible area of the memory;
receive notification of the absence; and
generate an interrupt associated with the absence.

21. The non-transitory computer readable medium of claim 19, wherein the instructions, if executed by the processing device, further cause the processing device to:
determine a type of the exception; and
select to preempt or stall the process based upon the determined type.

22. The non-transitory computer readable medium of claim 21,
wherein the memory exception is caused by a process:
wherein the statistic comprises a number of memory exceptions caused by the process; and
wherein determining whether the process should be context switched is based upon whether the number of memory exceptions caused by the process exceeds the threshold.

* * * * *